United States Patent
Steffen

(10) Patent No.: US 8,511,635 B2
(45) Date of Patent: Aug. 20, 2013

(54) HOLDING DEVICE FOR FASTENING A LASER INSTRUMENT

(75) Inventor: Roman Steffen, Rebstein (CH)

(73) Assignee: Hilti Aktiengesellschaft, Schaan (LI)

( * ) Notice: Subject to any disclaimer, the term of this patent is extended or adjusted under 35 U.S.C. 154(b) by 101 days.

(21) Appl. No.: 12/770,480

(22) Filed: Apr. 29, 2010

(65) Prior Publication Data

US 2010/0276554 A1    Nov. 4, 2010

(30) Foreign Application Priority Data

Apr. 30, 2009   (DE) .................. 10 2009 002 749

(51) Int. Cl.
*F16M 13/00* (2006.01)

(52) U.S. Cl.
USPC ........ 248/558; 248/689; 248/205.1; 248/911; 33/299

(58) Field of Classification Search
USPC .................. 248/689, 558, 645, 205.1, 206.5, 248/274.1, 911; 33/286, 299
See application file for complete search history.

(56) References Cited

U.S. PATENT DOCUMENTS

| | | | | |
|---|---|---|---|---|
| 2,900,159 A * | 8/1959 | Mattox | ..................... | 248/229.15 |
| 5,495,675 A * | 3/1996 | Huang | ............................. | 42/115 |
| 6,209,834 B1 * | 4/2001 | Stonehouse | ................ | 248/274.1 |
| 6,256,895 B1 * | 7/2001 | Akers | ............................ | 33/286 |
| 6,438,854 B1 * | 8/2002 | Kott, Jr. | .......................... | 33/286 |
| 6,470,579 B2 * | 10/2002 | Allen | ................................ | 33/286 |
| 6,826,841 B2 * | 12/2004 | Liao | ................................. | 33/286 |
| 6,922,901 B1 * | 8/2005 | Chou et al. | ...................... | 33/290 |
| 7,328,516 B2 * | 2/2008 | Nash et al. | ....................... | 33/286 |
| 7,611,105 B1 * | 11/2009 | Carazo | ........................ | 248/187.1 |
| 7,631,434 B1 * | 12/2009 | Carter, Jr. | ........................ | 33/293 |
| 7,685,723 B2 * | 3/2010 | Kallabis | .......................... | 33/286 |
| 2003/0014872 A1 * | 1/2003 | Chen | ................................ | 33/286 |
| 2005/0172502 A1 * | 8/2005 | Sergyeyenko et al. | .......... | 33/286 |
| 2010/0122466 A1 * | 5/2010 | Hemingway et al. | ........... | 33/228 |
| 2010/0187392 A1 * | 7/2010 | Berger et al. | ............. | 248/231.41 |

FOREIGN PATENT DOCUMENTS

| | | |
|---|---|---|
| DE | 203 04 117 U1 | 6/2003 |
| DE | 10 2007 019 610 A1 | 10/2008 |

OTHER PUBLICATIONS

German Search Report, dated Aug. 19, 2009, 2 pages.

* cited by examiner

*Primary Examiner* — Bradley Duckworth
(74) *Attorney, Agent, or Firm* — Crowell & Moring LLP

(57) ABSTRACT

A holding device for fastening a laser instrument, in particular to a magnetic construction, a pipe, a wall rail or ceiling rail, and/or a wall, is disclosed. The holding device includes a basic frame, a receptacle device connected to the basic frame to accommodate the laser instrument, a first fastening device connected to the basic frame and a second fastening device connected to the basic frame. At least the first or second fastening device is configured to be adjustable in a vertical direction relative to the basic frame.

11 Claims, 2 Drawing Sheets

HOLDING DEVICE FOR FASTENING A LASER INSTRUMENT

This application claims the priority of German Patent Document No. 10 2009 002 749.1, filed Apr. 30, 2009, the disclosure of which is expressly incorporated by reference herein.

BACKGROUND AND SUMMARY OF THE INVENTION

The present invention relates to a holding device for fastening a laser instrument, in particular to a magnetic construction, a pipe, a wall rail or ceiling rail, and/or a wall, comprised of a basic frame, a receptacle device connected to the basic frame to accommodate the laser instrument, a first fastening device connected to the basic frame and a second fastening device connected to the basic frame.

Laser instruments that generate point-shaped and/or line-shaped laser beams are known for performing leveling or marking work in interior and exterior construction. These laser beams are used to transfer reference points and/or reference lines onto walls, ceilings and/or floors. A distinction is made in terms of these laser instruments between rotating lasers and point and/or line lasers. Rotating lasers generate a line-shaped laser beam by rotating a laser beam source or beam-deflecting optics around a rotational axis. Point and/or line lasers generate laser beams through beam-forming optics such as cylindrical lenses or prisms. Point and/or line lasers are frequently configured to be self-leveling in a limited angular range. To this end, the beam unit is suspended for example on a pendulum device. The beam device aligns with the plumb line itself within the self-leveling range in the earth's gravitational field independent of an alignment of the laser instrument so that the laser beams are precisely aligned in the horizontal or vertical direction.

Projecting a point-shaped or line-shaped laser beam at a specific height on a wall requires that the laser instrument be arranged at the appropriate height. Various holding devices are known from the prior art that can be used to fasten a laser instrument to a wall, a wall rail or ceiling rail, to a pipe and/or a magnetic construction.

German Patent Document No. DE 203 04 117 U1 discloses a laser instrument that is attached to a wall by means of a holding device. The holding device is arranged in an opening of the laser instrument so that it is removable. The holding device is comprised of a basic element, a magnet attached to the basic element and a ramp. The basic element can cooperate with a fastening device, for example a wall assembly, a pin assembly or a bolt assembly. The fastening devices are each comprised of a magnetic plate, which cooperates with the basic element via the magnet.

The Applicant offers various accessory parts for its laser instruments for fastening the laser instrument to different substrates, for example, to a wall, a wall rail or ceiling rail, a pipe and/or a magnetic construction. Included among these are a pipe adapter PMA 70, a wall bracket PMA 71, a magnet bracket PMA 74, a dry wall adapter PMA 75 and a ceiling clamp PMA 76. The wall bracket PMA 71 is comprised of a basic frame, a height-adjustable receptacle device connected to the basic frame to accommodate the laser instrument and a wall mounting device connected to the basic frame. To fasten the laser instrument to a pipe, the pipe adapter PMA 70 is connected to the wall bracket PMA 71. Once the wall bracket is connected to the pipe adapter PMA 70, it is only possible to fasten the laser instrument to a pipe via the pipe adapter, fastening it by the wall mounting device is not possible. The magnet bracket PMA 74 is comprised of a basic frame, a receptacle device connected to the basic frame and a magnetic holding element connected to the basic frame. The ceiling clamp PMA 76 is comprised of a basic frame, a height-adjustable receptacle device connected to the basic frame and a rail mounting device connected to the basic frame, which rail mounting device is comprised of a height-adjustable lower bearing element and an eccentric to clamp the rail between the lower bearing element and a fixed upper bearing element.

In addition, a holding device is also known that is comprised of a basic frame, a height-adjustable receptacle device connected to the basic frame to accommodate the laser instrument and a holding device connected to the basic frame, which holding device has a wall mounting device on the upper end of the basic frame, a magnetic adapter on the rear side of the basic frame and a tripod adapter or pedestal on the underside. The disadvantage is that the holding device does not permit fastening to a pipe and a wall rail or ceiling rail.

In addition, a holding device for fastening a laser instrument to a wall, a magnetic construction and a pipe is known. The holding device is comprised of a basic frame, a receptacle device arranged on the upper side of the basic frame and connected to the basic frame, and a holding device connected to the basic frame. The holding device has a magnetic adapter on the rear side and underside, and screw holes on a lateral surface as a wall mounting device. It also has a horizontal and a vertical belt guide, through which a commercially available belt can be pulled to fasten the holding device to a pipe. The holding device abuts the pipe with the horizontal belt guide on the underside and with the vertical belt guide on the rear side of the holding device. The disadvantage is that the holding device abuts the pipe with the magnetic adapter that is configured to be flat, which produces a small contact surface, above all in the case of cylindrical pipes. In addition, the holding device does not permit fastening to a wall rail or ceiling rail.

The objective of the present invention on the other hand is to increase the flexibility and reliability of the fastening and make a compact holding device available to the user which permits fastening to different substrates, in particular to a magnetic construction, a pipe and/or a wall rail or ceiling rail.

This objective is attained with the holding device according to the present invention in that at least the first or second fastening device is configured to be adjustable in a vertical direction relative to the basic frame. The adjustability of at least one fastening device, preferably the first and second fastening devices, makes it possible to adjust the fastening to the local conditions. In order to increase the stability of the fastening, the fastening device should be arranged as far up on the basic frame as possible. On the other hand, it may be necessary for space reasons to fasten the holding device in the lower region of the basic frame, or where only a limited substrate is available for the fastening.

In a preferred embodiment, the first and second fastening devices are arranged on a first basic element, wherein the first basic element is configured to be adjustable in the vertical direction by an adjusting device, which especially preferably has a rough adjustment device and a precision adjustment device. If the first and second fastening devices are arranged on a common basic element, both fastening devices can be adjusted in the vertical direction by an adjusting device. The holding device can be structured in a compact manner since one adjusting device is eliminated.

In another preferred embodiment, a third fastening device connected to the basic frame is provided. It is especially preferred that the first fastening device is configured for fastening to a magnetic construction with at least one magnetic holding element, the second fastening device is configured for fastening to a pipe with at least one pipe adapter and the third fastening device is configured as a rail mounting device for fastening to a wall rail or ceiling rail with at least one upper and lower contact element.

In an especially preferred embodiment, the first fastening device has at least a first and a second magnetic holding element and the second fastening device has at least a first and a second pipe adapter, wherein the second magnetic holding element and the second pipe adapter are arranged on a second basic element. The stability of the fastening is increased because of a second magnetic holding element and a second pipe adapter.

In another preferred embodiment, the first basic element comprises the lower contact element of the rail mounting device. It is especially preferred that the first basic element comprises the upper contact element and the second basic element comprises the lower contact element of the rail mounting device. In this case, the rail mounting device is especially preferably configured to be adaptable to different thicknesses of wall rails and/or ceiling rails by the adjusting device of the first basic element. This design of the first basic element makes it possible to adjust three fastening devices in the vertical direction. A single adjusting device can be used to adjust the position of the magnetic holding element, of the pipe adapter and of the upper and lower contact element relative to the basic frame in the vertical direction.

In a further preferred embodiment, a fourth fastening device connected to the basic frame is provided, wherein the fourth fastening device is configured in particular as a wall mounting device for fastening the holding device to a wall.

Additional advantages and advantageous embodiments of the subject of the invention can be found in the description and drawings. Similarly, the characteristics cited in the foregoing and those listed below according to the invention can respectively be used individually or multiply in any combination. The embodiments that are shown and described should not be understood as an exhaustive enumeration, rather they have an exemplary character in describing the invention.

DETAILED DESCRIPTION OF THE DRAWINGS

Figure 1:
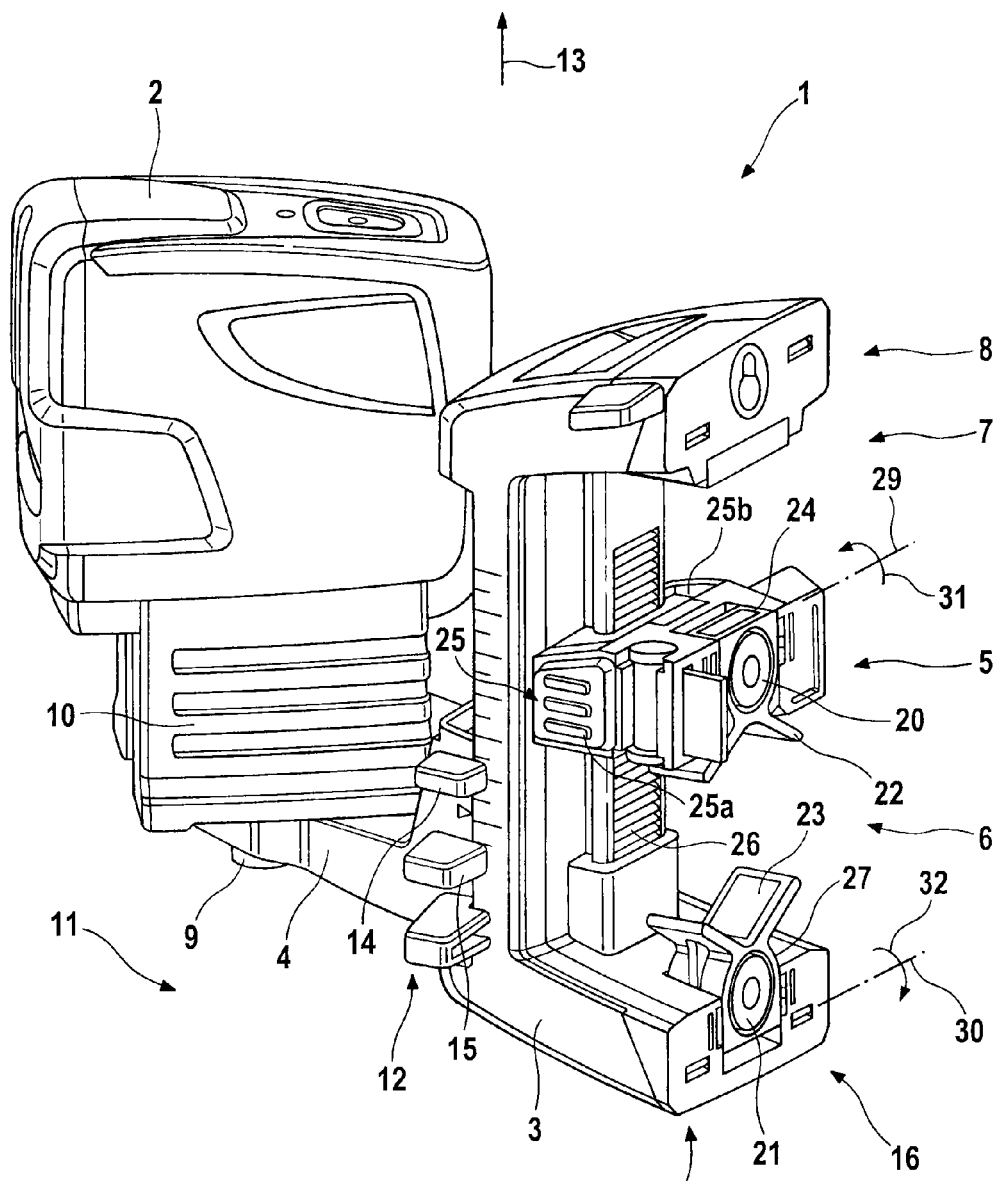
FIG. 1 illustrates a holding device according to the present invention with a magnetic holding element, a pipe adapter and a rail mounting device, wherein the magnetic holding element is arranged in an active position and the pipe adapter is arranged in a passive position.

The holding device 1 according to the invention depicted in FIG. 1 for fastening a laser instrument 2 is comprised of a U-shaped basic frame 3, a receptacle device 4 connected to the basic frame 3 to accommodate the laser instrument 2, as well as a first, second, third and fourth fastening device 5-8, with which the holding device 1 is fastened to a magnetic construction, a pipe, a wall rail or ceiling rail, and/or a wall, which are summarized in the following as the substrate.

The laser instrument 2 is connected to the holding device 1 by the receptacle device 4. To do so, the receptacle device 4 has a thread screw 9, which can be screwed into a corresponding mating thread (not shown) of the laser instrument 2. In the design in FIG. 1, the laser instrument 2 is not directly connected to the receptacle device 4. The laser instrument 2 is arranged on a base 10, which has a mating thread (not shown), into which the thread screw 9 is screwed. The laser instrument 2 can also be connected directly to the receptacle device 4 without the base 10. After the thread screw 9 is loosened, it is possible to adjust the alignment of the laser instrument 2. The receptacle device 4 is attached to a front side 11 of the basic frame 3 and configured to be adjustable along the basic frame 3 via an adjusting device 12. The direction in which the receptacle device 4 is adjustable relative to the basic frame 3 is designated as the vertical direction 13. The adjusting device 12 is comprised of a rough adjustment device 14 and a precision adjustment device 15. The adjusting device 12 can be used to adjust the position of the laser instrument 2 in the vertical direction 13 very precisely without the position of the holding device 1 on the substrate having to be modified.

The holding device 1 has four fastening devices 5-8 on the rear side 16 of the basic frame 3 opposite from the front side 11, which makes it possible to fasten the laser instrument 2 to a magnetic construction, a pipe, a wall rail or ceiling rail, and to a wall.

Provided on the rear side 16 of the basic frame 3 are a first and second magnetic holding element 20, 21 as a first fastening device 5 as well as a first and second pipe adapter 22, 23 as a second fastening device 6. The first magnetic holding element 20 and the first pipe adapter 22 are arranged on a first basic element 24 and configured to be adjustable in the vertical direction 13 via an adjusting device 25, which engages with a gear rack 26. The adjusting device 25 is comprised of a rough adjustment device 25a and a precision adjustment device 25b. The rough adjustment device 25a is used to adjust the position of the first basic element 24 in an approximate manner relative to the basic frame 3, for example, prior to fastening the holding device 1 to the substrate. The precision adjustment device 25b is used to adjust the position of the first fastening device 5 very precisely in the vertical direction 13. Alternatively, the adjusting device 25 may have a motor and a control unit, and adjustment in the vertical direction 13 may take place in a controlled manner, for example, by a remote control.

The second magnetic holding element 21 and the second pipe adapter 23 are arranged on a second basic element 27. In the design in FIG. 1, the second basic element 27 is arranged on a lower end 28 of the basic frame 3 and fastened in the vertical direction 13 relative to the basic frame 3. Alternatively, the second basic element 27, like the first basic element 24, can also be configured to be adjustable in the vertical direction 13 and be provided with an adjusting device, which engages in the gear rack 26. A second basic element 27 that is adjustable in the vertical direction 13 is advantageous if not only the distance in the vertical direction 13 between the first and the second basic elements 24, 27 is supposed to be adjusted, but also the position of the basic elements 24, 27 with respect to the laser instrument 2.

In the design in FIG. 1, the first fastening device 5 has two magnetic holding elements 20, 21 and the second fastening device 6 is comprised of two pipe adapters 22, 23. A single magnetic holding element or a single pipe adapter also makes it possible to fasten the holding device 1 to a magnetic construction or to a pipe. The second magnetic holding element or the second pipe adapter increases the reliability and stability of the fastening. The danger that the holding device 1, and therefore, the laser instrument 2 tip over is reduced by the second magnetic holding element or the second pipe adapter.

The first and second basic elements 24, 27 are configured to be rotatable around an axis of rotation 29, 30, wherein the basic elements 24, 27 can be adjusted from a first position into a second position. In the first position, the magnetic holding elements 20, 21 are in an active position, as shown in FIG. 1, and make it possible to fasten the holding device 1 to a wall or other magnetic construction. The pipe adapter 22, 23 is in the first position of the basic elements 24, 27 in a passive position and it is not possible to fasten the holding device 1 to a pipe. In order to fasten the holding device 1 to a pipe, the first basic element 24 is rotated 90° counterclockwise (arrow 31) around the axis of rotation 29 and the second basic element 27 is rotated 90° clockwise (arrow 32) around the axis of rotation 30 into the second position.

Figure 2:
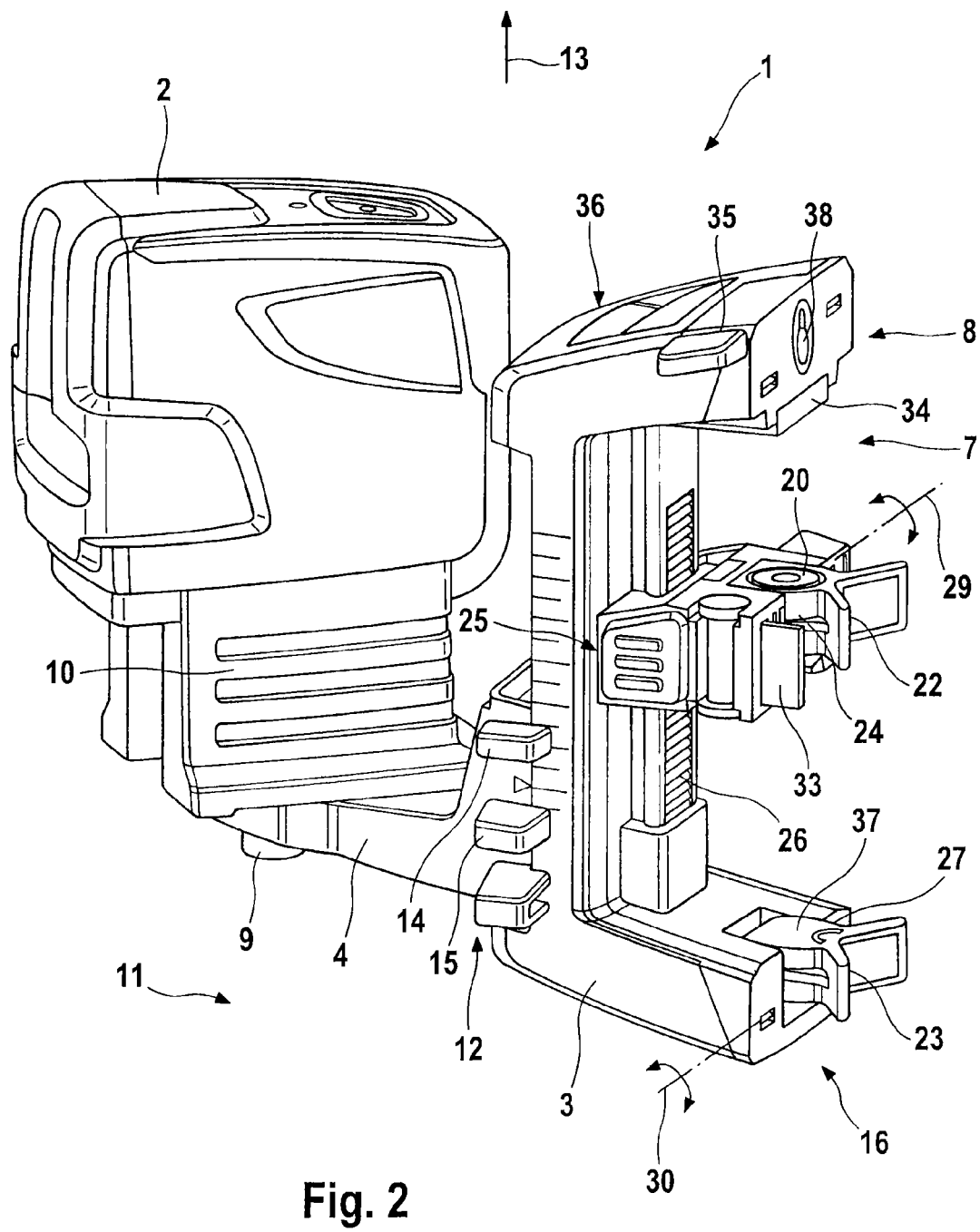
FIG. 2 illustrates the holding device of FIG. 1 with the magnetic holding element in a passive position and the pipe adapter in an active position.

FIG. 2 shows the holding device 1 according to the present invention with the first and second fastening devices 5, 6 in the second position, in which the magnetic holding elements 20, 21 are arranged in a passive position and the pipe adapters 22, 23 are arranged in an active position. The holding device 1 can be fastened to a pipe via the pipe adapter 22, 23 and a belt 33, which is depicted only partially in FIG. 2.

The pipe adapters 22, 23 are comprised of two contact surfaces each arranged in a V-shaped manner, which abut the pipe. The dimensions of the contact surfaces and the angle between the contact surfaces are dimensioned in such a way that the pipe adapters 22, 23 make fastening possible to typical pipe cross sections and pipe diameters in interior work, such as, for example, sewage pipes or clamping bars. The contact surfaces are configured to be adjustable in order to adapt the pipe adapters 22, 23 to different pipe diameters and pipe cross sections, for example, rectangular and cylindrical pipes. Adjusting devices (not shown) can be used to adapt the angle between the contact surfaces of the pipe adapters 22, 23 to the respective pipe diameter. Alternatively, the pipe adapters 22, 23 can be configured of an elastic material so that the angle between the contact surfaces adapts to the pipe geometry when applied to a pipe in a limited range.

In addition to the first and second fastening devices 5, 6, a third fastening device 7 in the form of a rail mounting device is arranged on the rear side 16 of the basic frame 3. The rail mounting device 7 is comprised of an elastically configured upper contact element 34 and a clamping device 35 in the form of an eccentric, which is arranged on an upper end 36 of the basic frame 3. The first basic element 24 serves as the lower contact element for a rail, and therefore, as a counter bearing for the upper contact element 34. The adjusting device 25 of the first basic element 24 is used to adjust the distance between the upper contact element 34 and the first basic element 24 as the lower contact element to different rail sizes. By actuating the clamping device 35, the rail is clamped between the upper contact element 34 and the first basic element 24.

The holding device 1 can also be fastened to a rail by the first and second basic element 24, 27. In this case, the first basic element 24 serves as the upper contact element and the second basic element 27 as the lower contact element. Serving as contact elements for the rail are the magnetic holding elements 20, 21, elastically configured pipe adapters 22, 23, or a magnetic holding element 20, 21 and a pipe adapter 23, 22. Alternatively, the basic elements 24, 27 on the sides of the basic elements 24, 27 opposite from the magnetic elements 20, 21 comprise contact elements 37 for the rail. The adjusting device 25 of the first basic element 24 serves as the clamping device, which is actuated until the rail is clamped securely between the basic elements 24, 27.

In addition, provided on the upper end 36 of the basic frame 3 is the fourth fastening device 8 in the form of a wall mounting device. The wall mounting device 8 has an opening 38, to accommodate a nail, a screw or a similar fastening element, which is attached in a wall.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A holding device for fastening a laser instrument, comprising:
    a frame;
    a receptacle device connected to the frame;
    a first fastening device connected to the frame and configured for fastening to a magnetic construction with at least one magnetic holding element; and
    a second fastening device connected to the frame and configured for fastening to a pipe with at least one pipe adapter;
    wherein the first and the second fastening devices are at least partially arranged on a first basic element, wherein the first basic element is adjustable in a vertical direction relative to the frame by an adjusting device, and wherein the first basic element is adjustable relative to the frame from a first position into a second position such that:
    in the first position, the holding device is fastenable by the at least one magnetic holding element and not the at least one pipe adapter; and
    in the second position, the holding device is fastenable by the at least one pipe adapter and not the at least one magnetic holding element.

2. The holding device according to claim 1, wherein the adjusting device has a rough adjustment device and a precision adjustment device.

3. The holding device according to claim 1, further comprising a third fastening device connected to the frame.

4. The holding device according to claim 1, wherein the first fastening device has at least a first and a second magnetic holding element, wherein the second fastening device has at least a first and a second pipe adapter, and wherein the second magnetic holding element and the second pipe adapter are arranged on a second basic element.

5. The holding device according to claim 3, further comprising a fourth fastening device connected to the frame, wherein the fourth fastening device is configured as a wall mounting device.

6. A holding device for fastening a laser instrument, comprising:
    a frame;
    a receptacle device connected to the frame;
    a first fastening device connected to the frame and configured for fastening to a magnetic construction with at least one magnetic holding element;
    a second fastening device connected to the frame and configured for fastening to a pipe with at least one pipe adapter;
    wherein at least one of the first and the second fastening devices are at least partially arranged on a first basic element and wherein the first basic element is adjustable in a vertical direction relative to the frame by an adjusting device; and
    a third fastening device connected to the frame;
    wherein the third fastening device is configured as a rail mounting device for fastening to a wall rail or ceiling rail with at least one upper and lower contact element.

7. The holding device according to claim 6, wherein the first basic element is comprised by the lower contact element of the rail mounting device.

8. The holding device according to claim 6, wherein the rail mounting device is configurable to different thicknesses of wall rails and/or ceiling rails by the adjusting device of the first basic element.

9. A holding device for fastening a laser instrument, comprising:
- a frame;
- a receptacle device connected to the frame;
- a first fastening device connected to the frame and configured for fastening to a magnetic construction with at least one magnetic holding element;
- a second fastening device connected to the frame and configured for fastening to a pipe with at least one pipe adapter;
- wherein at least one of the first and the second fastening devices are at least partially arranged on a first basic element and wherein the first basic element is adjustable in a vertical direction relative to the frame by an adjusting device; and
- a third fastening device connected to the frame, wherein the third fastening device is configured as a rail mounting device for fastening to a wall rail or ceiling rail with at least one upper and lower contact element, wherein the first fastening device has at least a first and a second magnetic holding element, wherein the second fastening device has at least a first and a second pipe adapter, and wherein the second magnetic holding element and the second pipe adapter are arranged on a second basic element, and further wherein the first basic element is comprised by the upper contact element and the second basic element is comprised by the lower contact element of the rail mounting device.

10. A holding device for fastening a laser instrument, comprising:
- a frame;
- a receptacle device connected to the frame;
- a first fastening device connected to the frame and configured for fastening to a magnetic construction with a magnetic holding element; and
- a second fastening device connected to the frame and configured for fastening to a pipe with a pipe adapter;
- wherein the first and the second fastening devices are arranged on a basic element, wherein the basic element is adjustable in a vertical direction relative to the frame by an adjusting device, and wherein the basic element is adjustable relative to the frame from a first position into a second position such that:
- in the first position, the holding device is fastenable by the magnetic holding element and not the pipe adapter; and
- in the second position, the holding device is fastenable by the pipe adapter and not the magnetic holding element.

11. The holding device according to claim 10:
- wherein the first fastening device includes a second magnetic holding element;
- wherein the second fastening device includes a second pipe adapter;
- and wherein the second magnetic holding element and the second pipe adapter are arranged on a second basic element.

* * * * *